April 21, 1925.  1,534,294
P. E. BARKER
DUMP TRUCK HOISTING MECHANISM
Filed Aug. 27, 1921   6 Sheets-Sheet 5

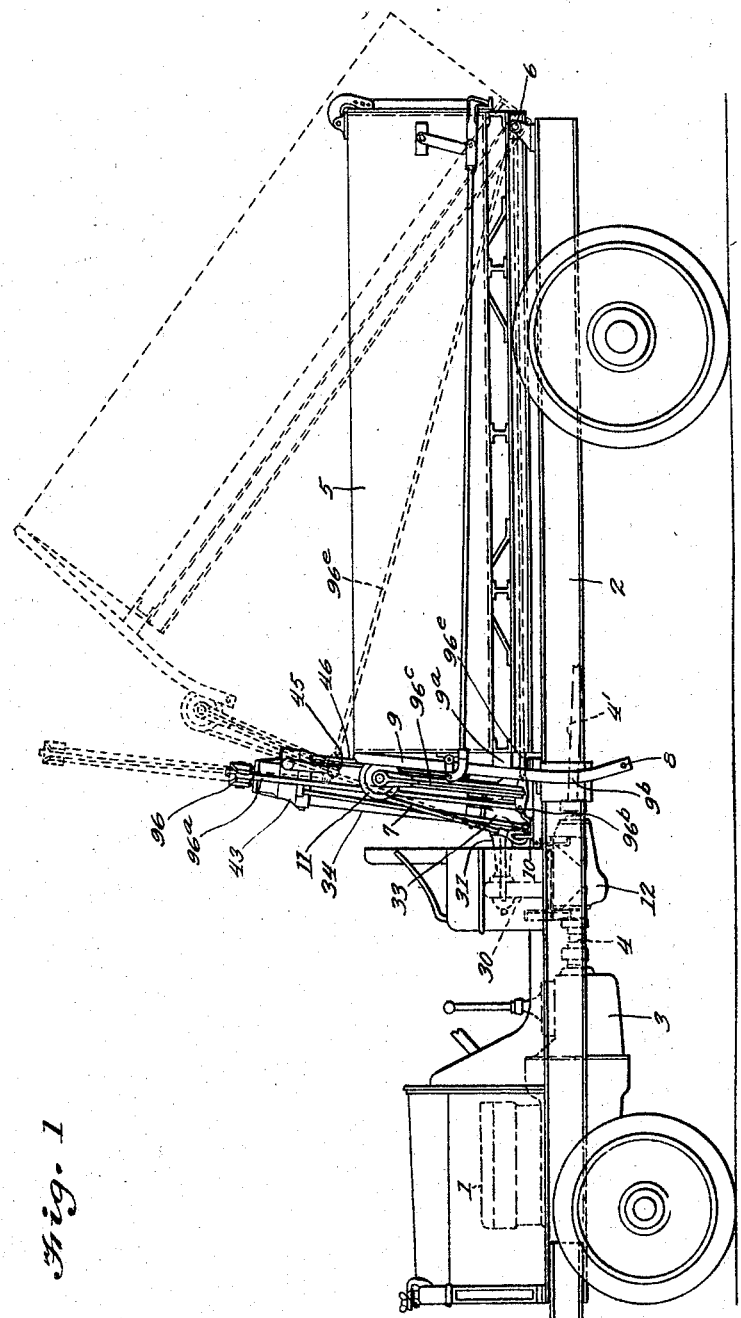

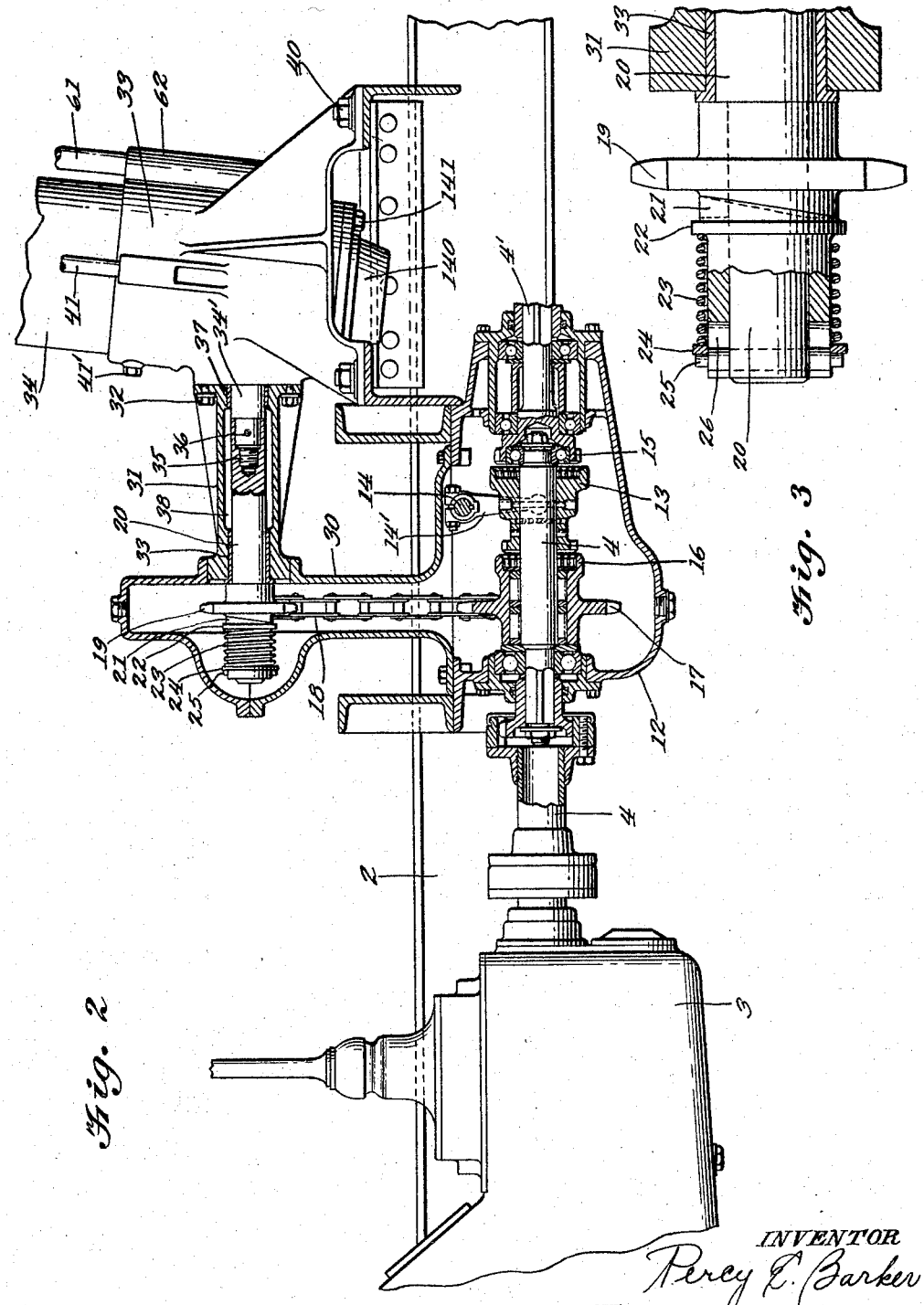

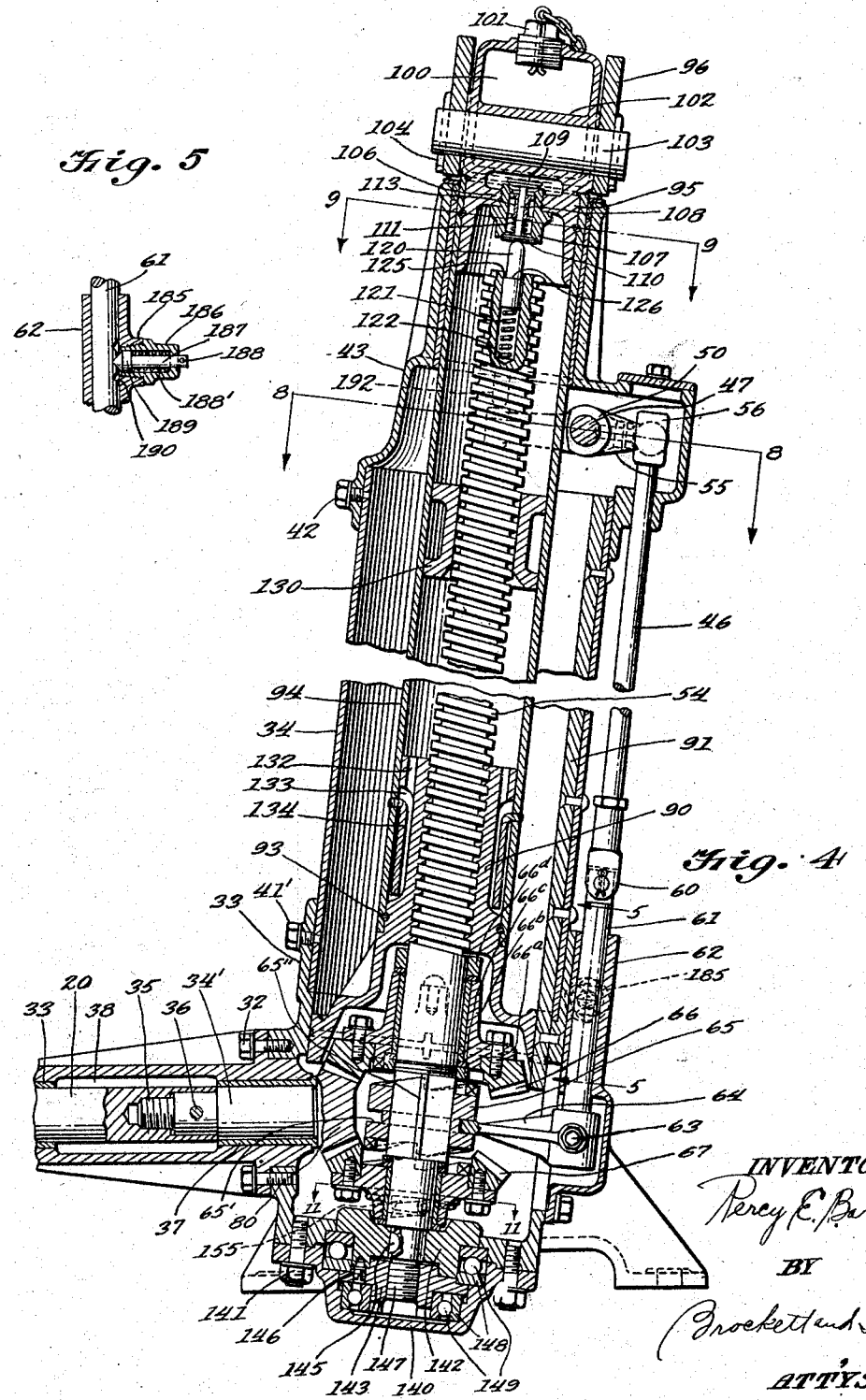

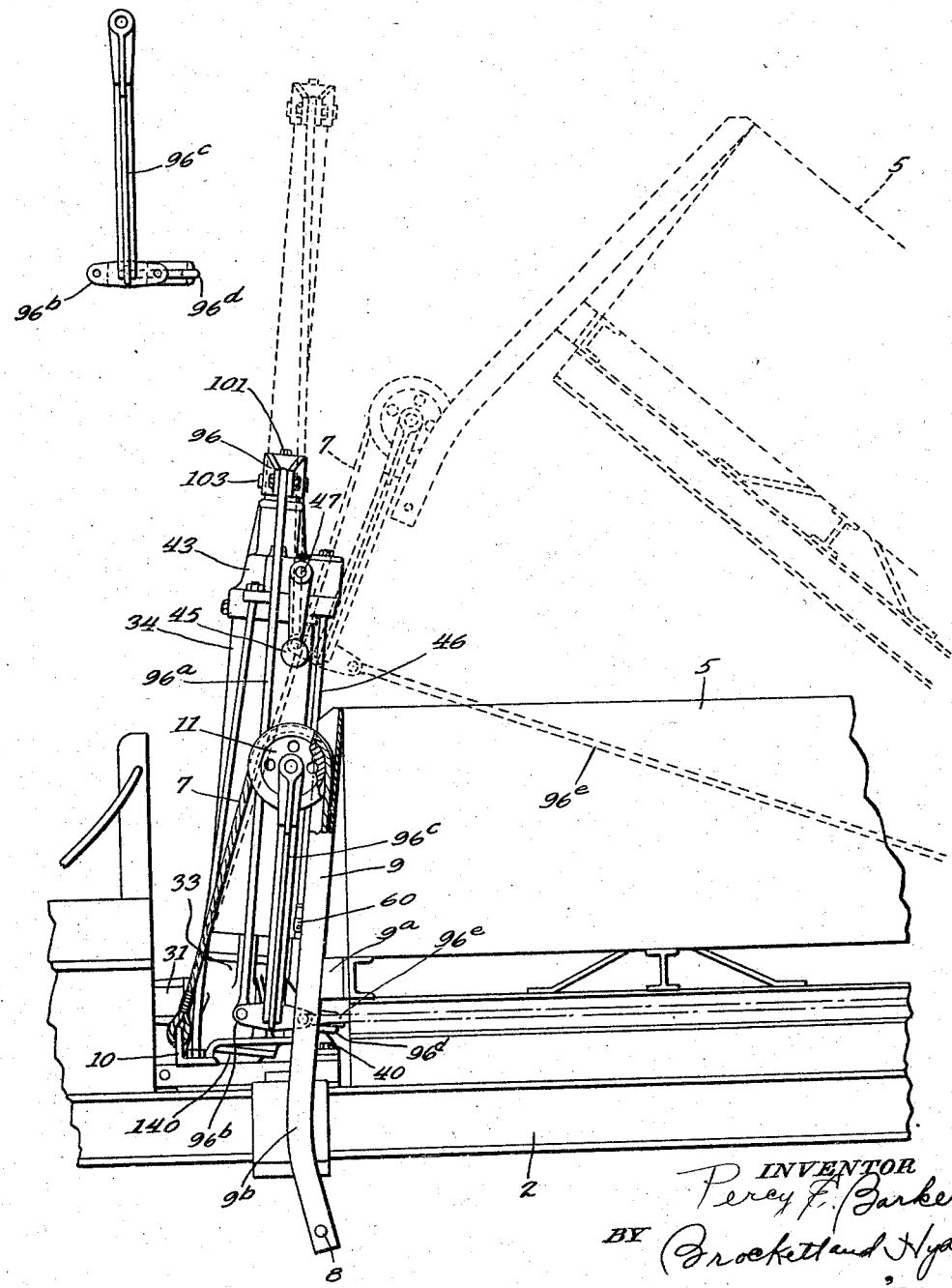

INVENTOR
Percy E. Barker
BY
Brockett and Hyde
ATT'YS

April 21, 1925.

P. E. BARKER 1,534,294

DUMP TRUCK HOISTING MECHANISM

Filed Aug. 27, 1921  6 Sheets-Sheet 6

INVENTOR
Percy E. Barker,
BY Crockett and Hyde
ATT'YS

Patented Apr. 21, 1925.

1,534,294

UNITED STATES PATENT OFFICE.

PERCY E. BARKER, OF CLEVELAND, OHIO, ASSIGNOR TO THE VAN DORN IRON WORKS COMPANY, OF CLEVELAND, OHIO, A CORPORATION OF OHIO.

DUMP-TRUCK HOISTING MECHANISM.

Application filed August 27, 1921. Serial No. 496,116.

*To all whom it may concern:*

Be it known that I, PERCY E. BARKER, a citizen of the United States, residing at Cleveland, in the county of Cuyahoga and State of Ohio, have invented certain new and useful Improvements in Dump-Truck Hoisting Mechanism, of which the following is a specification.

This invention relates to improvements in hoist or dump trucks.

The object of this invention is to provide an improved hoisting mechanism for a truck body in which the cables and sheaves forming a part of such mechanism will maintain effective hoisting relation with the truck body throughout practically the entire extent of the cables.

Other objects of this invention will be apparent from the following description and claims when considered together with the accompanying drawings.

Figure 8:
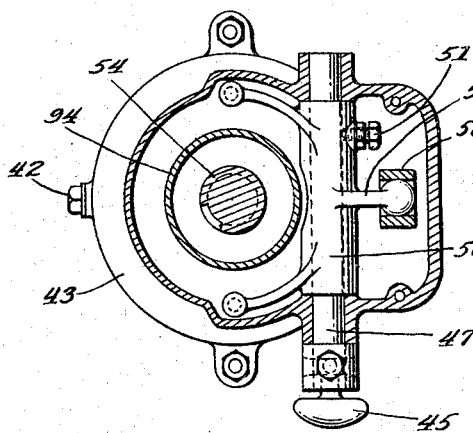
Figure 9:
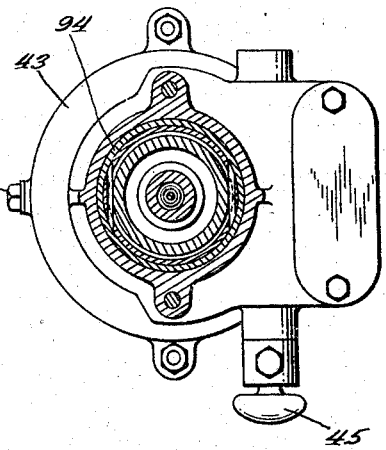
Figure 14:
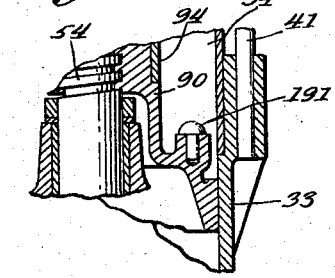
Figure 12:
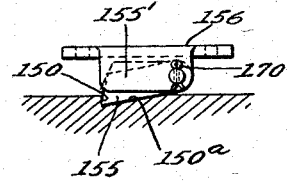
Figure 11:
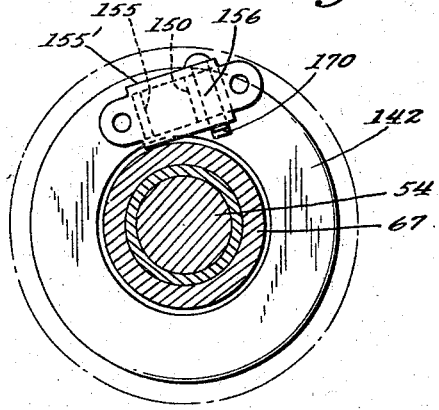
Figure 10:
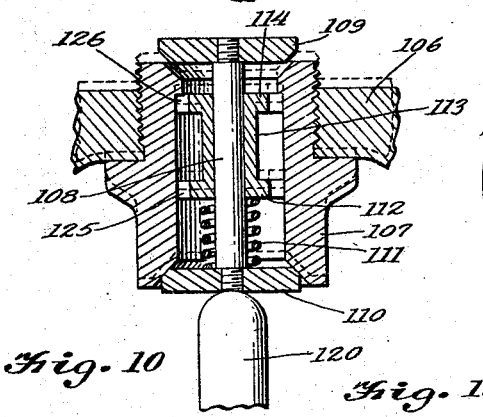
Figure 13:
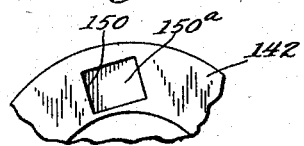
Figure 15:
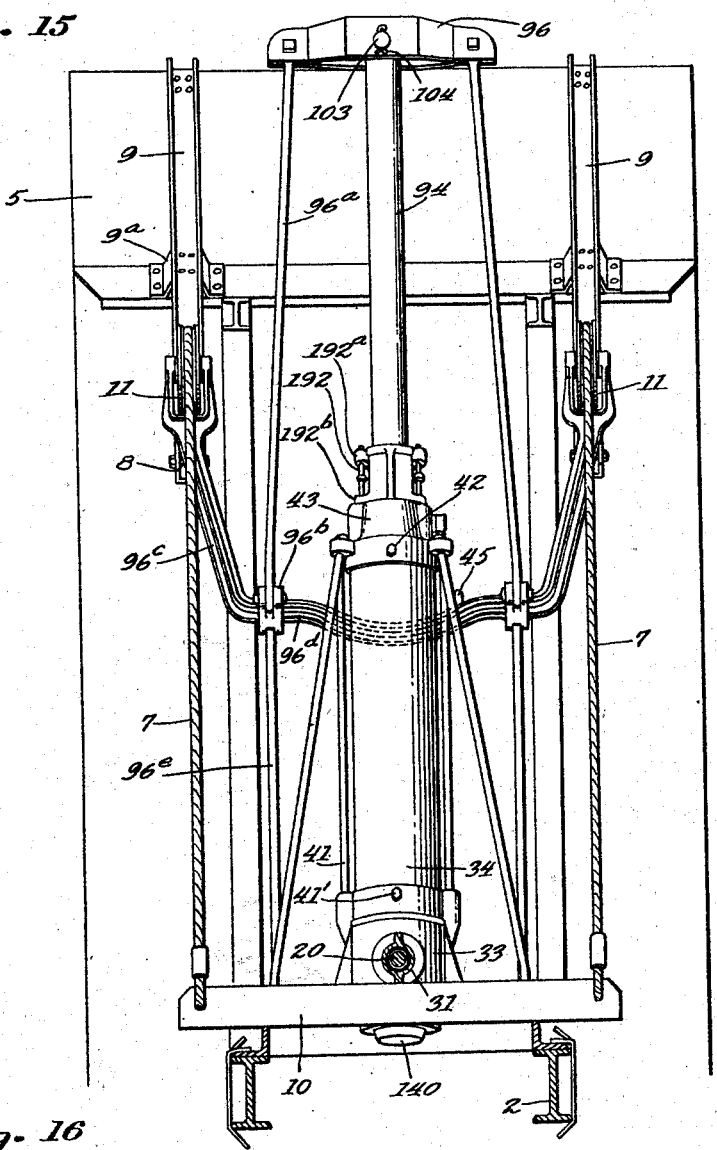
Figure 16:
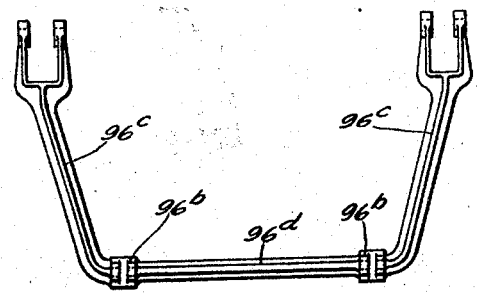

Fig. 1 is a side elevation of my improved dumptruck hoisting mechanism; Fig. 2 is a detail view of the drive connection to the hoisting mechanism; Fig. 3 is a detail view of the one-way clutch to the hoisting mechanism; Fig. 4 is a detail view of the hoisting mechanism; Fig. 5 is taken on line 5—5, Fig. 4 and shows a latch for the lever rod; Fig. 6 is a detail elevation of the hoisting mechanism in general; Fig. 7 is a detail elevation of the sheave frame; Fig. 8 is a section taken on line 8—8 of Fig. 4; Fig. 9 is a section on line 9—9 of Fig. 4; Fig. 10 is a detail view of the oil valve; Fig. 11 is a section on line 11—11 of Fig. 4; Fig. 12 is an elevation of the dog; Fig. 13 shows in plan the notch which is engaged by the dog; Fig. 14 is a detail view of the trip button on the hoisting nut; Fig. 15 is a front elevation of the sheave operating lever mechanism in hoisted position; and Fig. 16 is a detail view of the cast metal frame for the sheaves.

In the device as here shown gas engine 1 as usual is mounted on the front end of the chassis 2 and has drive connection through the gearing enclosed in the casing 3 with the shaft 4 and the aligned shaft 4' which extends rearwardly to the rear axle. The gearing enclosed in the casing 3 includes the combinations for high, low, and intermediate speeds as well as for reverse drive. The truck body 5 which is pivotally mounted at 6 at the rear end of the chassis is adapted to be raised and lowered by means of the cables 7 attached at 8 to the lower ends of the channel bars 9 on the front end of the truck body and attached at their other ends to the angle iron on the chassis. The hoisting movement is effected by means of the sheaves 11 which are projected upwardly by means of mechanism operated from shaft 4, as will be later described.

The transmission casing 12 encloses a clutch member 13 which is keyed upon shaft 4 and is adapted upon actuation of the operating shaft 14 connected to yoke 14', to be thrown into engagement with the companion clutch member 15 fast upon the drive shaft 4' for driving operation of the truck. The clutch member 13 can also be shifted forwardly for engagement with the companion clutch member 16 which is loosely mounted upon the shaft 4 and which carries a sprocket 17. This sprocket by means of the chain 18 has driving connection with the smaller sprocket 19 which is loosely mounted upon and has one way clutch connection with the shaft 20. This one way clutch connection comprises the inclined and toothed surface of the sprocket member 19 for driving connection with the correspondingly formed surface on the companion clutch member 21 which is slidably mounted upon the shaft 20. An annular shoulder 22 is provided upon one end of the clutch member 21 and forms an abutment for one end of the spiral spring 23 which abuts at its other end against the annular ring 24. The ring 24 is forced by the spring 23 against the pin 25 which extends through the end portion of the shaft 20 and also through the diametrically disposed slots 26 provided in the ends of the clutch member 21. Thus a positive drive is effective from the sprocket 19 through the engaging teeth of the two clutch members, from the clutch member 21 through the pin 25 to the shaft 20. This drive connection is effected when the sprocket 19 is operated in one direction only, that is, when the engine is set for direct or forward drive. When, however, the gears are shifted for reverse drive of the truck, the inclined or cam faces of the clutch member carried by the sprocket 19 will slip past the cam faces of the clutch member 21 and cause a movement of the clutch member 21 along the shaft 20 against the tension of the spring 23, which straight line movement is permitted by the slot and pin arrangement at the outer ends of the shaft and clutch member 21. Thus when the truck is in reverse drive, no motion will be transmitted through the clutch to the shaft 20. Other forms of one-way clutches may be used at this point.

The sprocket 19 and the chain 18 are enclosed in the casing 30 which is bolted upon the top of the transmission casing 12. The shaft 20, as it extends to the right of the sprocket 19, as viewed in Fig. 3, is given suitable support in the tubular bearing 31 which is attached by means of the bolts 32 to the side of the cast metal base 33 of the casing 34 which encloses the nut and screw mechanism for raising and lowering the truck body. A bushing 33 is provided and the shaft 20 is given positive driving connection with the stub shaft 34' by means of the screw threaded connection 35 and the lock pin 36. The bushing 37 is also provided and a space 38 is preserved at this point between the bearing 31 and the shaft 20. With this arrangement I am enabled to attach my hoisting mechanism including the one way clutch connection to a standard mechanism for raising and lowering the truck body. In this particular instance the only parts necessary for such drive connection are the tubular supporting member with its bushings and the connection just now described between the shaft 20 and the stub shaft 34'.

The cast metal base 33 is supported upon the chassis in any suitable manner as for instance by the screw bolts 40 and is engaged by the brace rods 41 which engage at their upper ends ears provided upon the cast metal top portion 43. The casing 34 is secured within the cast metal base by means of the bolts 41' and is secured by means of the bolts 42 at its upper end to the cast metal top portion 43 which is formed at one side with a housing for enclosing the connection between the operating handle 45 and the upwardly extending operating rod 46. As seen in the drawings, the base and casing are inclined slightly to the rear. The handle 45 is fast upon the shaft 47 which is mounted in the top portion 43. A yoke member 50 is also rigidly mounted upon the shaft 47 by means of set screw 51 extending through the opposite shoulder of the yoke member 50 and engaging the shaft 47. The oppositely disposed arms of the yoke member 50 terminate at points on diametrically opposed sides of the screw shaft 54, while the rearwardly extending portion 55 of the yoke member terminates in a ball shaped portion which is adapted for swivel connection in the socket 56 of the upwardly extending rod 46. A clevis 60, screw threaded on rod 46 has pivotal connection with the rod 61 which extends through the tubular guide portion 62 formed on the cast metal base 33. The lower end of the rod 61 is connected at 63 with the yoke 64 which is adapted for operative engagement with the annular groove 65' of the intermediate clutch member 65. This clutch member 65 is keyed, as indicated at 65", upon the lower plain end portion of the screw shaft 54 and is adapted for drive connection with either the upper or lower bevel gears 66 and 67, respectively, which are freely mounted with the intermediate bushings upon the screw shaft 54. These bevel gears are suitably mounted by means of screw bolts upon the annular flanges $66^a$ of hubs $66^b$ which surround the screw shaft with intermediate bushings and are supported in such position by means of the thrust collars $66^c$ and $66^d$. The stub shaft 34' has fixedly mounted upon its other end the intermediate bevel pinion 80 which meshes with both the upper and lower bevel gears 66 and 67. Thus it will be seen that upon operation of the shaft 34 both of the bevel gears 66 and 67 will be operated in opposite directions, but no motion of the screw shaft 54 will be caused unless the clutch member is moved upwardly or downwardly into clutched engagement with gear 66 or 67.

The present structure is so arranged that upon movement of the handle 45 to the right, as viewed in the drawings, the operating rod 46 will be moved upwardly which means that the intermediate clutch member will be brought into driving connection with the upper bevel gear 66. The screw shaft is then operated for upward movement of the truck body by means of the nut 90 which will be caused to move upwardly along the screw shaft. The nut 90 is prevented from rotating by means of the key 91 secured in any suitable manner as by riveting along the inner face of the casing 34. Rigidly mounted upon the nut 90 by means of the pin and slot connection 93 is the plunger 94 which at its upper end has swiveling connection with the cast metal support 95 for cross head 96. The connection at 93 is a rigid one by virtue of the fact that the companion semi-circular grooves in the nut and plunger extend only tangentially and thus prevent any relative movement between these two parts, whereas the pin and slot connection between the upper member 95 and the plunger 94 allows a swivelling movement between these two parts because of the fact that the groove in the cast member extends completely thereabout with a straight pin engaging tangentially in only a portion of the groove. Thus the force of a blow striking the cross head will not be transmitted to the mechanism at the lower end of the plunger. The cross head 96 has attached thereto the upper ends of rods $96^a$ which extend outwardly and downwardly for pivotal connection with the ears $96^b$ on the cast metal frame comprising the arms $96^c$ for the sheaves. The sheaves 11 are mounted in the upper ends of the arms 96ᶜ which are joined at their lower ends with a transversely extending portion 96ᵈ which is curved about the casing. The sheaves seat in the channel bars 9 at all times and upon raising the cross head they will ride along the same, the sheave frame turning upon its point of pivotal connection with rods 96ᵃ which are projected along a rectilinear path. The sheaves are directed along a curved path by means of the rods 96ᵉ pivotally mounted on the axis of the truck body and pivotally connected at their forward ends to the rearwardly extending ears on the casting. The channel bars 9, which for the main part are inclined outwardly from the perpendicular, as at 9ᵃ, are inclined rearwardly at at 9ᵇ towards the same perpendicular and terminate at their lower ends at a point somewhat below the bottom of the truck frame, as indicated on the drawing.

The upper cast member 95 is provided at its extreme upper portion with an oil reservoir 100 closed by a suitable screw cap 101, this oil chamber having extending therethrough a tubular portion 102 through which extends the supporting pin 103 for the cross head 96. Cotter pins 104 maintain the cross pin in proper position. The lower portion of the cast metal member 95 is provided with the annular inwardly extending web 106, which defines the bottom of the oil reservoir 100. This web has seated therein by means of screw threaded engagement the valve casing 107 within which is mounted the valve stem 108 carrying at its upper end the valve 109 and at its lower end the valve 110. Conical seats are provided for these two valves and a spring 111 normally holds the lower valve 110 in open position with the upper valve closed. The spring 111 which abuts at its lower end against the valve 110 has bearing engagement at its upper end against the web 112 fixed within the valve casing and extending as a guiding portion 113 for the pin 108 and terminating in the web 114. A pin 120 is seated within the upper end portion of the screw shaft and is normally forced upwardly by means of the spiral spring 121 which has suitable abutment at 122 at its lower end. A suitable stop is provided at 125 for the shoulder 126 formed upon the pin 120 so as to limit its upper movement. Thus it will be seen that when the cross head and likewise the truck body are in extreme lowered position, the valve 110 will strike the pin 120; and since the spring 121 is stronger than the spring 111, the valve 110 will be closed and the valve 109 opened. The valve casing 107, which serves as an oil measuring and delivering device, is now filled by oil flowing from the chamber 100 through the ports 125 and 126 provided in the webs 112 and 114 respectively. Then upon raising the truck body by upward movement of the cross head, the valve 110 will leave the rod 120 and the tension of spring 111 will cause the valve 109 to close and the valve 110 to open. The oil contained within the casing 107 is then permitted to flow by gravity out of the valve casing down through the plunger 94 past the guide sleeve 130 and to the top of the nut 90 which is provided with ports 132 for passage of the oil therethrough. These ports communicate at their lower ends with the chamber 133 within which are enclosed wicks 134 extending out through the side of the plunger 90. The oil which will work its way by capillary attraction up through the wicks will pass outside of the plunger 94 and on to the lower portion of the nut which it then passes and finally reaches the gearing in the lower portion of the casing. The oil eventually settles in the base cover 140 which is removably secured to the cast metal base by means of the bolts 141.

The extreme lower end of the cast metal base encloses also the thrust bearings 142 and 143 for the lower end of the screw shaft. As will be apparent, the thrust collar 142 will take up longitudinal or vertical thrust while the lower thrust collar will take up transverse thrust upon this end of the screw shaft. The thrust collar 142 is keyed as indicated at 154 to the screw shaft and a set screw 146 screws the lower thrust collar 143 in locked position after being screw threaded upon the extreme lower end of the shaft as indicated at 147. Suitable washers 148 and ball bearings 149 are provided for the thrust collars. The upper thrust collar is provided with a notch 150 formed in the upper face of this collar. This notch 150 is adapted for engagement by the dog 155 which is pivotally mounted by means of a pin upon the flanged strap 156 which in turn is secured by means of bolts to the lower portion of the bevel gear 67. A cotter pin 170 secures the pin which extends through the registering apertures in the depending flanges 155′ of the strap and dog. The object of this dog and notch construction is to prevent accidental settling of the truck body by gravity while the truck is in motion. As will be seen from the drawings, any tendency of the nut 90 to work its way downwardly and to thereby cause a turning movement of the screw shaft will cause the dog 150 to engage the wall at the end of the notch and prevent what would otherwise result in the turning of the screw and lowering of the truck body. Such a locking of the parts against such movement is made possible in my device because of the fact that the mechanical driving connection between the thrust collar 142 on the shaft 54 through the bevel gears, shafts 34′ and 20 to the sprocket wheels 19 and 17 constitutes sufficient load to prevent turning of the screw shaft. Relative movement in the opposite direction is permitted between collar 142 and gear 67 since the pivoted dog will ride up the incline face 150ª of the notch and thus pass over the same.

The tubular portion 62 of the cast metal base 33 is provided with an outwardly extending boss 185 within which is screw threaded a housing 186. A latch pin 187, provided with a transverse stop pin 188 in its outer end, extends through this housing and is surrounded by a spiral spring 188' abutting against the shoulder of the tapered end portion 189 of the pin and normally forces the same into engagement with one of the recesses 190 in the operating rod 61. The purpose of this structure is to automatically hold the operating rod 46 in the position to which it is brought, there being provided three notches corresponding to the raising, lowering, and neutral positions of the intermediate clutch member 65. As a means of automatically limiting the raising and lowering movements of the cross head I have provided a trip button 191 seated in a boss upon the side of the base portion of the nut 90, this trip member being adapted for engagement with the lower face of the yoke member 50 which, as will be apparent, extends downwardly while the operating handle 45 is set for raising operation of the truck body. Then, when the operating handle 45 is set for lowering operation of the truck body, the yoke arm will extend somewhat upwardly and with my mechanism will be engaged by the downwardly extending pin 192 which is suitably mounted upon the cross head at 192ª and extends through guides 192ᵇ on the cast member 95 to the inside of the same.

From the above it will be seen that with my device I am able to either raise or lower the truck body with the gears set for high, low or intermediate speed, but such operation is possible only during direct drive of the truck because of the one way clutch connection which makes it impossible to transmit motion from the motor to the nut and screw mechanism during reverse drive. It will also be clear that the truck itself can be propelled forwardly or backwardly only when the hoisting mechanism is disconnected from the drive shaft of the motor.

It will be seen also that the sheaves maintain at all times substantially the same relative hoisting position with respect to the points of attachment of the cables to the channel bars; which is made possible by the particular swinging movement of the sheaves through the curved path described by them. Thus the sheaves have paths of movement corresponding in a definite manner with those of the points 8 and also with respect to the axis 6, while the cross head moves in a straight line. Thus an effective hoisting operation is had throughout substantially the entire extent of the cables, with the consequent increased efficiency.

Other advantages resulting from this invention will be apparent to those who are familiar with the art to which it relates.

What I claim is:

1. In a dump truck, the combination of a chassis, a truck body mounted thereon and capable of raising and lowering movement, a cable having its ends secured to fixed parts of said chassis and truck body respectively, a sheave about which said cable extends, a support for said sheave, guide means for said sheave extending upwardly from the body end of said cable, and means for projecting said support bodily so as to move said sheave along said guide means.

2. In a dump truck, the combination of a chassis, a truck body mounted thereon and capable of raising and lowering movement, a cable fastened at one end to the lower front portion of said truck body and at its other end to a fixed part of said chassis, a sheave about which said cable extends, a bodily movable support for said sheave, a channel on the end of said body for said sheave and extending below said body, and means for bodily moving said support so as to project said sheave along said channel.

3. In a dump truck, the combination of a chassis, a truck body mounted thereon and capable of raising and lowering movement, a cable having its ends secured to said chassis and truck body respectively, a sheave about which said cable extends, a support for said sheave, an operating arm pivoted to said support, means for projecting said operating arm so as to cause said sheave to maintain a position above the body end of said cable for hoisting operation throughout substantially the entire extent of said cable.

4. In a dump truck, the combination of a chassis, a truck body mounted thereon and capable of raising and lowering movement, cables attached to said chassis and truck body, a cross-head and downwardly extending arms attached thereto, upwardly extending arms pivoted to the lower ends of said first named arms and carrying sheaves at their upper ends for hoisting engagement with said cables, and means for raising and lowering said cross-head.

5. In a dump truck, the combination of a chassis, a truck body mounted thereon and capable of raising and lowering movement, a guide way provided on the one wall of said truck body, a cable attached to fixed parts of said chassis and truck body, a sheave engaging said cable and having riding engagement in said guide way, and means for moving said sheave along said guide way for raising and lowering said truck body.

6. In a dump truck, the combination of a chassis, a truck body pivotally mounted thereon and capable of raising and lowering movement, a guide way provided on the one wall of said truck body, a cable attached to said chassis and truck body, a sheave engaging said cable and having riding engagement in said guide way, and means for moving said sheave along said guide way for raising and lowering said truck body, said means including a pivotally mounted support for said sheave and a rod having pivotal support on the axis of said truck body and connected to said sheave support.

7. In a dump truck, the combination of a chassis, a truck body mounted thereon and capable of raising and lowering movement, channel bars on the front end of said truck body, cables attached to said chassis and to the lower ends of a fixed part of said channel bars, sheaves engaging said cables and having riding engagement in said channel bars, and means for moving said sheaves along said channel bars for raising and lowering said truck body.

8. In a dump truck, the combination of a chassis, a truck body mounted thereon and capable of raising and lowering movement, channel bars on the front end of said truck body, cables attached to said chassis and to the lower ends of a fixed part of said channel bars, sheaves engaging said cables and having riding engagement in said channel bars, and means for moving said sheaves along said channel bars and maintaining said sheaves in said channel bars for raising and lowering said truck body.

9. In a dump truck, the combination of a chassis, a hoisting member movable substantially vertically in a fixed path, a truck body mounted on said chassis and having a part movable in a path diverging from said fixed path, a cable secured to the frame and to the said body, lifting means engaging a bight of the cable, and a support therefor movably connected to said operating and lifting devices and adapted to accommodate itself to diverging relative movement thereof as the truck body is raised.

10. A dump truck, comprising a frame, an operating device movable substantially vertically thereon in a fixed path, an adjustable body having a portion moving in a path diverging from said fixed path, cable anchoring means thereon, a cable extending from said anchoring means to the frame, and an operating member between said cable and operating device and having portions adapted to partake respectively of substantially the motions of said body part and operating device.

11. A dump truck, comprising a frame, an operating device movable substantially vertically thereon in a fixed path, an adjustable body having a movable portion, a cable extending between said body and frame, a lifting device in a bight of the cable, and means connecting said lifting device and operating device and arranged to move said lifting device toward the body as the latter rises.

12. A dump truck, comprising a frame, an operating device movable substantially vertically thereon in a fixed path, an adjustable body having a movable portion, a cable extending between said body and frame, a lifting device in a bight of the cable, means connecting said lifting device and operating device and arranged to move said lifting device toward the body as the latter rises, and guiding means on the body for said lifting device.

13. A dump truck, comprising a frame, an operating device movable substantially vertically thereon in a fixed path, an adjustable body having a movable portion, cable anchoring means depending from the body, a cable extending between said anchoring means and frame, a lifting device in a bight of the cable, and means connecting said lifting device and operating device and arranged to move said lifting device toward the body as the latter rises.

14. A dump truck, comprising a frame, an operating device movable substantially vertically thereon in a fixed path, an adjustable body having a movable portion, cable anchoring means depending from the body, a cable extending between said anchoring means and frame, a lifting device in a bight of the cable, and means connecting said lifting device and operating device and arranged to move said lifting device toward the body as the latter raises, said cable anchoring means being also arranged to guide said lifting device as the body rises.

15. A dump truck, comprising a frame, an operating device movable substantially vertically thereon in a fixed path, an adjustable body having a movable portion, a cable extending between said body and frame, a vertically extending lifting device having its upper portion in a bight of the cable, and means connecting the lower portion of said lifting device to said operating device and arranged to move said lifting device toward the body as the latter rises.

16. A dump truck, comprising a frame, an operating device movable substantially vertically thereon in a fixed path, an adjustable body having a movable portion, a cable extending between said body and frame, a vertically extending lifting device having its upper portion in a bight of the cable, means connecting the lower portion of said lifting device to said operating device and arranged to move said lifting device toward the body as the latter rises, and means for controlling motion of the lower portion of said lifting device.

17. A dump truck, comprising a frame, an operating device movable substantially vertically thereon in a fixed path, an adjustable body having a movable portion, a cable extending between said body and frame, a vertically extending lifting device having its upper portion in a bight of the cable, means connecting the lower portion of said lifting device to said operating device and arranged to move said lifting device toward the body as the latter rises, and means extending from the frame to the lower portion of said lifting device for controlling the motion thereon.

18. A dump truck, comprising a frame, an operating device movable substantially vertically thereon in a fixed path, an adjustable body having a movable portion, a cable extending between said body and frame, a vertically extending lifting device having its upper portion in a bight of the cable and its lower portion provided with horizontally separated pivots, and means connecting one of said pivots to said operating device, whereby said lifting device is held toward the body as the latter rises.

19. A dump truck, comprising a frame, an operating device movable substantially vertically thereon in a fixed path, an adjustable body having a movable portion, a cable extending between said body and frame, a vertically extending lifting device having its upper portion in a bight of the cable and its lower portion provided with horizontally separated pivots, means connecting one of said pivots to said operating device, whereby said lifting device is held toward the body as the latter rises, and means on the body for guiding the lifting device.

In testimony whereof I hereby affix my signature.

PERCY E. BARKER.